(12) United States Patent
Nijhawan et al.

(10) Patent No.: US 8,078,890 B2
(45) Date of Patent: Dec. 13, 2011

(54) SYSTEM AND METHOD FOR PROVIDING MEMORY PERFORMANCE STATES IN A COMPUTING SYSTEM

(75) Inventors: Vijay Nijhawan, Austin, TX (US); Madhusudhan Rangarajan, Round Rock, TX (US)

(73) Assignee: Dell Products L.L.P., Round Rock, TX (US)

( * ) Notice: Subject to any disclaimer, the term of this patent is extended or adjusted under 35 U.S.C. 154(b) by 580 days.

(21) Appl. No.: 11/853,255

(22) Filed: Sep. 11, 2007

(65) Prior Publication Data

US 2009/0070605 A1 Mar. 12, 2009

(51) Int. Cl.
G06F 1/00 (2006.01)
G06F 1/26 (2006.01)
G06F 1/32 (2006.01)
G06F 13/00 (2006.01)

(52) U.S. Cl. ......... 713/320; 713/300; 713/323; 711/100
(58) Field of Classification Search .................. 713/300, 713/320, 323; 711/100
See application file for complete search history.

(56) References Cited

U.S. PATENT DOCUMENTS

| | | | |
|---|---|---|---|
| 6,216,235 B1 | 4/2001 | Thomas et al. | |
| 6,457,135 B1 * | 9/2002 | Cooper | 713/323 |
| 6,487,668 B2 | 11/2002 | Thomas et al. | |
| 6,889,332 B2 * | 5/2005 | Helms et al. | 713/322 |
| 7,064,994 B1 | 6/2006 | Wu | |
| 7,065,663 B2 * | 6/2006 | Sheller | 713/320 |
| 7,155,630 B2 * | 12/2006 | Bell et al. | 713/600 |
| 7,243,254 B1 * | 7/2007 | Kuroodi et al. | 713/600 |
| 7,352,641 B1 | 4/2008 | Wu | |
| 7,409,572 B1 * | 8/2008 | Hung et al. | 713/500 |
| 2002/0066047 A1 * | 5/2002 | Olarig et al. | 713/323 |
| 2006/0064679 A1 * | 3/2006 | Ozaki | 717/127 |
| 2006/0174142 A1 * | 8/2006 | Lin et al. | 713/300 |
| 2007/0288782 A1 * | 12/2007 | Chang et al. | 713/323 |
| 2008/0052483 A1 | 2/2008 | Rangarajan et al. | |

OTHER PUBLICATIONS

Jayesh Iyer et al., System Memory Power and Thermal Management in Platforms Built on Intel Centrino Duo Mobile Technology, Intel Technology Journal, May 15, 2006, 123-32, vol. 10 Issue 2, Lin Chao, Online Publication available at http://www.intel.com/technology/itj/2006/volume10issue02/vol10_iss02.pdf.

* cited by examiner

*Primary Examiner* — Ji H Bae
(74) *Attorney, Agent, or Firm* — Baker Botts L.L.P.

(57) ABSTRACT

A system and method is disclosed for providing memory performance states in a computing system. The operating system power management component of the computing system establishes a set of performance states, with each performance state being defined by a number of factors, including the core frequency of memory. The operating system power management component also defines the number of memory performance states that are supported by the computing system and the number of supported memory performance states that are available for use by the computing system. Whether a supported memory performance state is available is dependent upon a measure of the power being consumed by the computing system, the thermal output of the computing system, or both measures.

19 Claims, 2 Drawing Sheets

SYSTEM AND METHOD FOR PROVIDING MEMORY PERFORMANCE STATES IN A COMPUTING SYSTEM

TECHNICAL FIELD

The present disclosure relates generally to computer systems and information handling systems, and, more particularly, to a system and method for providing preestablished memory performance states in a computing system to provide for reduced thermal output and power consumption.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

A computer system will generate heat. Unless heat is removed from the interior of a computer system, the components of the computer system may be damaged or the performance of the computer system could be negatively affected. Computer systems also consume power, which can be costly. The amount of power consumed by a computer system is related to the activity level of the computer system. The power consumption of a computer system may be considered excessive when the computer system consumes an amount of power that is not in proportion to the activity level of the computer system.

SUMMARY

In accordance with the present disclosure, a system and method is disclosed for providing memory performance states in a computing system. The operating system power management component of the computing system establishes a set of performance states, with each performance state being defined by a number of factors, including the core frequency of memory. The operating system power management component also defines the number of memory performance states that are supported by the computing system and the number of supported memory performance states that are available for use by the computing system. Whether a supported memory performance state is available is dependent upon a measure of the power being consumed by the computing system, the thermal output of the computing system, or both measures.

The system and method disclosed herein is technically advantageous in that it provides for distinct memory performance states. Some of the memory performance states may be characterized as lower performance state having a lower rate of power consumption and a lower thermal output. Thus, by transitioning to one of these lower performance states, the power consumed by the computing system and the thermal output of the computing system may be decreased. As such, the system and method disclosed herein provides an alternative to performance states that are premised on the operation of the processor of the computing system. In this environment, the processor could continue to operate normally while the performance state of the memory is controlled to manage the power consumption and thermal output of the computing system. The system and method disclosed herein is also advantageous because the operating system power management component can be used to control the memory performance states that are made available to the computing system. Thus, depending on the power consumption and thermal output of the computing system, the number of memory performance states that are available for use can be restricted to reduce the power consumption and thermal output of the computing system. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The system and method disclosed herein concerns memory performance states for a computing system. Multiple performance states are established, with each being associated with a different performance state for the memory of the computer system. As such, a performance state can be established for the memory of the computer system that corresponds to the activity level of the memory of the computer system. In this manner, and depending on the memory performance state of the computer system the heated generated by the computing system and the power consumed by the computing system may be reduced. Each performance state is associated with a level of power consumption in and the thermal output of the computer system.

Figure 1:
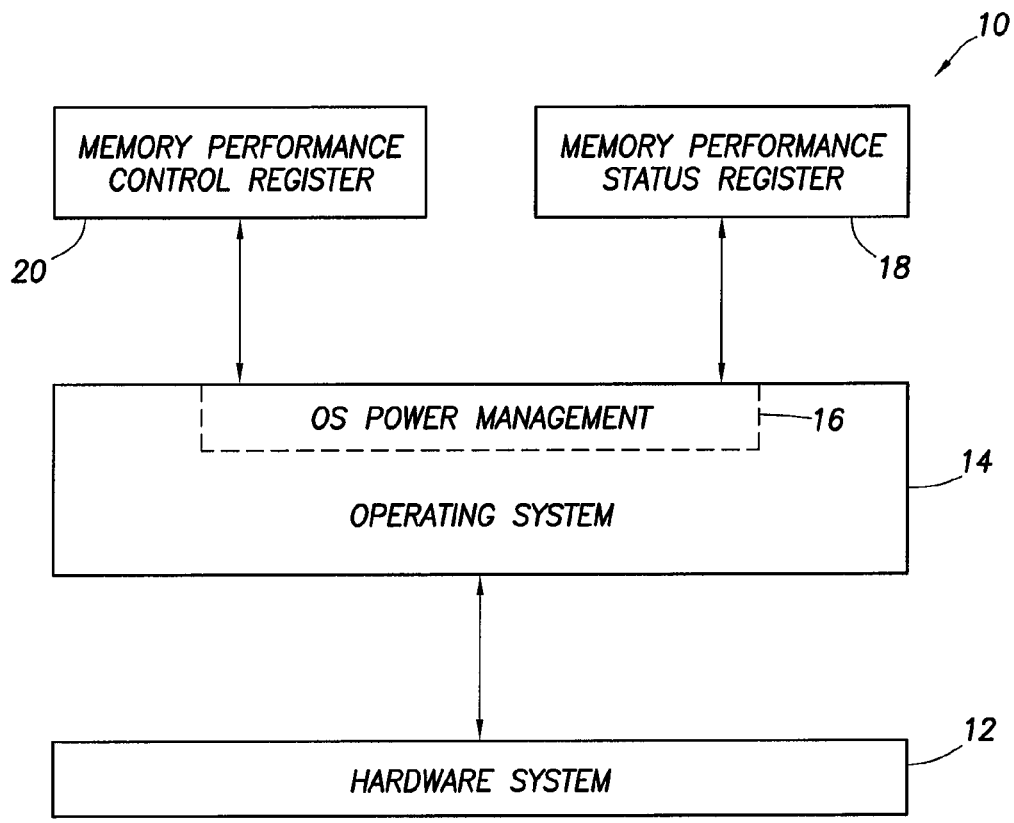
FIG. 1 is a diagram of hardware and software elements of a computer system.

Shown in FIG. 1 is a diagram of hardware and software elements of a computer system, which is indicated generally at 10. Computer system 10 includes a hardware layer 12, which includes a processor, memory, and the other hardware elements of the computer system. An operating system 14 executes on the processor and other components of hardware system 12. Included within operating system 14 is an operating system power management component (OSPM) 16. OSPM component 16 is the portion of the operating system 14 that controls, at an operating system level, the power management functions of the operating system, including transitioning the computer system between power management states. OSPM component 16 reads from and writes to two software registers: memory performance control register 20 and memory performance status register 18.

Figure 2:
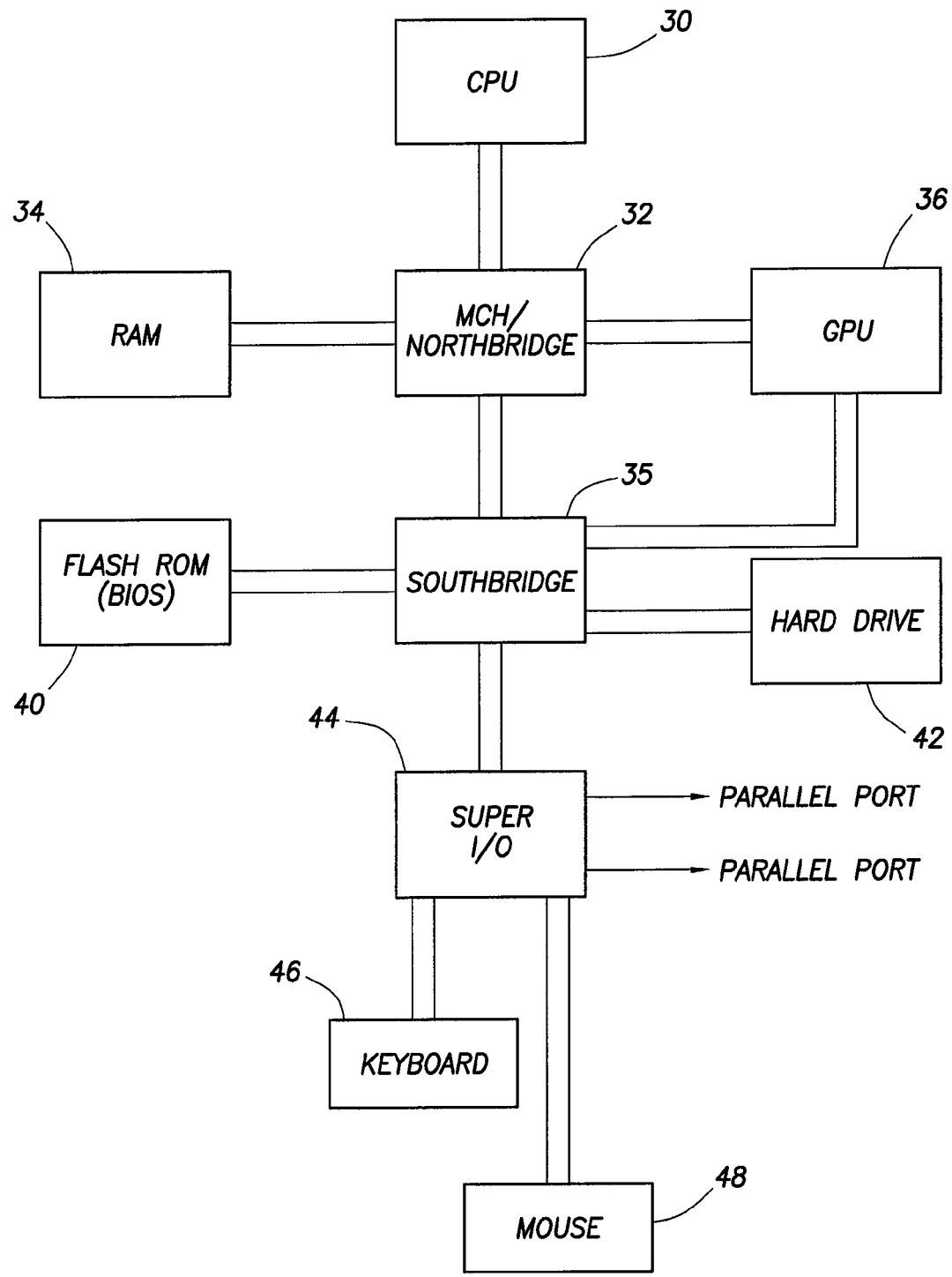
FIG. 2 is a diagram of a hardware system of a computer system.

A diagram of an example hardware system is shown in FIG. 2. A processor or CPU 30 of an example computer system 10 is communicatively coupled to a memory controller hub 32. Memory controller hub 32 is coupled to memory 34 and a graphics processing unit 36. Memory controller hub 34 is also coupled to an I/O controller hub 35. I/O hub 35 is coupled to storage elements of the computer system, including a storage element 40 for the BIOS of the computer system and the hard drive 42 of the computer system. I/O hub 34 may also be coupled to a Super I/O chip 44, which is itself coupled to many of the I/O ports of the computer system, including keyboard 46, mouse 48, and parallel ports. Depending on the configuration of the computer system, some of the components of the computer system, such as the memory controller hub 32 or hard drive 42, may act as a bus master to directly access memory 34.

Memory performance control register 20 uniquely identifies the memory performance state of the computer system. Memory performance status register 18 includes a code that identifies whether the computer system has successfully transitioned between memory performance states. Each of memory performance control register 20 and memory performance status register 18 are virtual registers that may be defined as software objects in the OSPM. In operation, the content of the memory performance control register identifies the memory state of the computer system. The OSPM reads from and writes to the memory performance control register. When the OSPM wants to change the memory performance state of the computer system, the OSPM writes a new value to the memory performance control register. The new value will be the value associated with the memory performance state to which the computer system will transition.

OSPM may also call a Memory Performance States Routine. The Memory Performance States Routine identifies the numbers of memory performance states that have been defined in the OSPM and returns that number to the calling routine within OSPM in the form of a value N. A value N indicates that there are a total of N+1 performance states are supported in the computer system and those performance states are numbered 0 through N. The 0th performance state is the highest performance state, which is characterized by the greatest amount of activity in the memory system. The Nth performance state is the lowest performance state, which is characterized as the lowest amount of activity in the memory system.

Each performance state is defined by a set number of variables. In one example, which is set out below, each performance state is defined by six variables:
  memory core frequency;
  typical power dissipation;
  memory transition latency;
  bus master transition latency;
  control value;
  status value;

Memory core frequency is expressed in hertz and is the frequency of the memory of the computer system. Typical power dissipation is expressed in milliwatts and describes the amount of power consumed by a typical, benchmarked computer system when in the defined performance state. Memory transition latency is expressed in microseconds and is a worst-case latency measure of the time during which the memory is unavailable during a transition from any other performance state to the defined performance state. During a period of memory transition latency, the memory will be in a self-refresh mode. Bus master transition latency is expressed in microseconds and is a worst-case latency measure of the time during which any bus master of the system is prevented from accessing the memory during a transition from any other performance state to the defined performance state. The control value is the value that is written to the memory performance control register 20 to indicate a transition to the defined state. Each defined state is uniquely identified with a control value for the purpose of identifying a transition to the state. Status value is a value that the OSPM will compare to the value of the memory performance status register to determine if the transition to the memory performance state was successful.

In operation, if OSPM determines that it will transition from one defined memory performance state to a second defined memory performance state, the OSPM will write the control value of the second defined memory performance state to the memory performance control register 20. The OSPM will also write the status value of the second defined memory performance state to the memory performance status register 18. A modification of the memory performance control register 20 causes the core frequency of the memory to the level associated with the second defined memory performance state. After a predefined period of time, the computer system will run a test routine to identify if the computer system is in the second defined performance state. This test may evaluate the memory core frequency, among other factors, and return a value, which is compared to the status value of memory performance status register 18. If the values match, the computer system has successfully transitioned to the second defined memory performance state. If the values do not match, the transition process enters a loop in which the computer system continues to reach the second defined memory performance state, as measured by the test routine. After a set number of tries, the transition process may time out and the computer system may return to the previous memory state.

Figure 3:
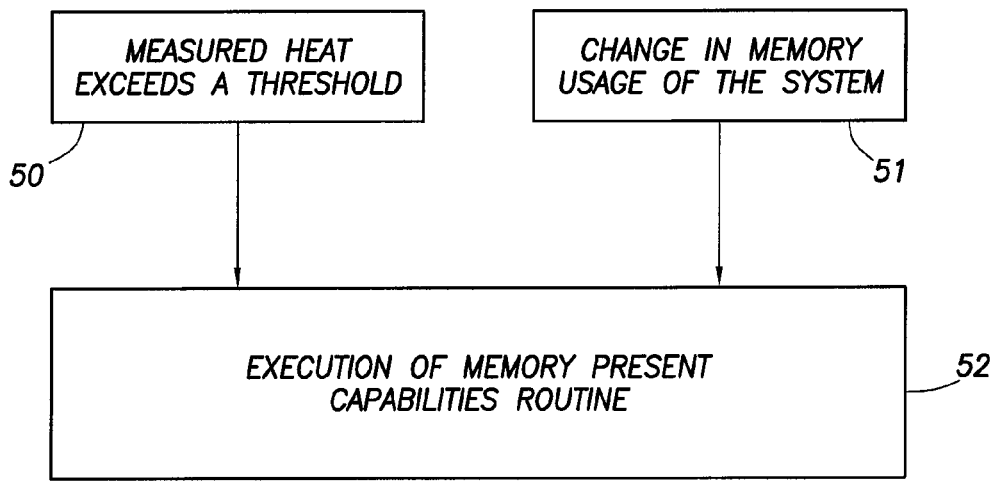
FIG. 3 is a flow diagram of a method for calling the Memory Present Capabilities Routine.

OSPM may also call a Memory Present Capabilities Routine, which identifies the memory states that are available to the OSPM. The result of the Memory Present Capabilities Routine is the number of memory performance states that are both supported and available in the computer system. In operation, as set out in FIG. 3, if the OSPM detects that the amount of heat being generated by the system exceeds a threshold (step 50) or if the OSPM detects a change in the memory usage of the system (step 51), OSPM will call the Memory Present Capabilities Routine (step 52). The result of the Memory Present Capabilities Routine is an integer value that sets a boundary for the number of states available. If, for example, the Memory Present Capabilities Routine returns the value 2, then memory performance states 2 through N are available, where N is defined through the Memory Performance States Routine as the computer system supporting N+1 performance states. In this example, because performance states 0 and 1 are not available, the two performance states associated with the highest performance or activity levels in the computer system are not supported. As a second example, if the value returned by the Memory Present Capabilities Routine is 0, then states 0 through N are available, which the result being that all of the supported memory performance states of the computer system are available. If the value N is returned, only the lowest performance of the memory states is available.

Depending on the amount of heat being generated by the computer system, the Memory Present Capabilities Routine, working through the OSPM, can dynamically return a value of between 0 to N. As an example, if an excessive amount of heat is being generated, the Memory Present Capabilities Routine could return an N, which would limit the OSPM to only the lowest performance of the memory states. As a second example, if the Memory Present Capabilities Routine detects that the computer system is generating a relatively low level of heat, the Memory Present Capabilities Routine could generate a value of 0, indicating all of the supported memory states of the computer system are available. In this manner, the OSPM can govern the management of memory states by limiting the available memory states, depending on the amount of heat being generated by the computer system.

Depending on the level of memory usage in the computer system, the Memory Present Capabilities Routine, working through the OSPM, can dynamically return a value of between 0 to N. Memory usage may be measured by a memory controller hub in the computer system. As an example, if the memory usage is at a low level, the Memory Present Capabilities Routine could return an N, which would limit the OSPM to only the lowest performance of the memory states, thereby matching the actual memory usage of the computer system. As a second example, if the memory usage is at high level, the Memory Present Capabilities Routine could generate a value of 0, indicating all of the supported memory states of the computer system are available, thereby providing the computer system with the necessary flexibility to choose a memory performance state that actually matches the memory usage of the computer system. Thus, the OSPM can manage the allocation of memory performance states to force the computer system to operate at a lower performance state when memory usage is at a low level.

In operation, an algorithm may be developed that uses both a measure of heat generation and a measure of memory usage to allocate the number of available memory states. For example, the algorithm could specify that, if the thermal output of the computer system is above a defined threshold, a value of N is returned by the Memory Present Capabilities Routine until the thermal output is below the threshold. In this manner, regardless of the memory usage of the computer system, the computer system is placed in a lower performance state until the thermal output of the computer system is below a predetermined. In addition, assuming that the computer system is below a threshold level of thermal output, the memory usage of the computer system could be the sole governing factor that determines the number of memory performance states available in the computer system.

The system and method disclosed herein described herein includes several advantages. The system and method provides a technique reducing power consumption and thermal output according by managing the memory states of the computer system. The system and method disclosed herein is not dependent on a particular architecture within the computer system. Rather, the system and method disclosed herein may be used with any computer system that includes memory, multiple memory states, and a method for managing the memory states. Although the present disclosure has been described in detail, it should be understood that various changes, substitutions, and alterations can be made hereto without departing from the spirit and the scope of the invention as defined by the appended claims.

What is claimed is:

1. A computing system, comprising:
a processor;
memory;
an operating system, wherein:
the operating system includes a power management component that is operable to place the memory of the computer system in multiple memory performance states of operation,
the multiple memory performance states of operation differ from one another according to the amount of power consumed by memory in each state of operation,
the operating system includes a supported states routine that produces an output identifying the multiple memory performance states of operation supported by the computing system,
the operating system includes a capabilities routine that produces an output identifying a set of the multiple memory performance states of operation supported by the computing system that are available for use,
the operating system is operable to limit the memory to the set of multiple memory performance states identified by the output of the capabilities routine, and
the operating system is further operable to cause a transition from a first of the multiple memory performance states of operation to a second of the multiple memory performance states of operation, wherein if the transition from the first of the multiple memory performance states of operation to the second of the multiple memory performance states of operation is unsuccessful after a predetermined number of attempts, the operating system returns to the first of the multiple memory performance states of operation.

2. The computing system of claim 1, wherein the multiple states of operation include,
a higher performance state in which the memory of the computing system operates at a higher core frequency; and
a lower performance state in which the memory of the computing system operates at a lower core frequency.

3. The computing system of claim 2, wherein the lower performance state of the computing system is associated with a lower thermal output of the computing system.

4. The computing system of claim 1, wherein the multiple states of operation are characterized by the operating frequency of the memory.

5. The computing system of claim 1, wherein the operating system defines a control register that includes a value that identifies the current performance state of the computer system.

6. The computing system of claim 1, wherein the operating system defines a status register that includes a value that is used as a test value to determine if the computer system has successfully transitioned between performance states.

7. The computing system of claim 1, wherein the supported states routine output is an integer value.

8. The computing system of claim 7, wherein the capabilities routine output is an integer value.

9. The computing system of claim 8, wherein the capabilities routine may provide an output that limits the operating system to the memory performance state of operation in which the memory operates at the slowest core frequency.

10. The computing system of claim 8, wherein the output of the capabilities routine is dependent upon a measure of the memory consumption of the computing system.

11. The computing system of claim 8, wherein the output of the capabilities routine is dependent upon a measure of the thermal output of the computing system.

12. A method for transition between a first memory performance state and second memory performance state in a computing system, comprising:
    writing a value to a control register, wherein the value is uniquely associated with the second performance state, wherein the second performance state is identified by the output of a supported states routine in the computing system as one of a plurality of memory performance states supported by the computing system, and wherein the second performance state is limited by a capabilities routine of the computing system to one of the plurality of memory performance states that are available for use;
    writing a value to a status register, wherein the value is uniquely associated with a successful transition to the second memory performance state;
    modifying the core frequency of the memory of the computing system to the predetermined core frequency associated with the second performance state;
    running a test routine;
    comparing the output of the test routine to the value of the status register to verify that the computing system successfully transitioned to the second memory performance state; and
    returning to the first memory performance state if the computing system does not successfully transition to the second memory performance state after the step of running the test routine is performed a predetermined number of times.

13. The method for transition between a first memory performance state and second memory performance state in a computing system of claim 12, further comprising, if the result of the test routine does not match the value of the status register, repeating the steps of modifying the core frequency of the memory of the computing system; running a test routine; and comparing the output of the test routine to the value of the status register.

14. The method for transition between a first memory performance state and second memory performance state in a computing system of claim 12, wherein the second performance state is both supported by the computer system and identified as being available in the computer system.

15. The method for transition between a first memory performance state and second memory performance state in a computing system of claim 12, wherein because the thermal output of the computing system is below a threshold all of the supported performance states of the computing system may comprise the second performance state.

16. A method for transitioning between a first memory performance state and a second memory performance state in a computing system, comprising:
    identifying the supported memory performance states in the computing system by an output of a supported states routine in the computing system;
    identifying the available memory performance states among the supported memory performance states of the computing system by an output of a capabilities routine in the computing system;
    writing a value to a control register, wherein the value is uniquely associated with the second performance state, wherein the second performance state is limited by the computing system to the available memory performance states identified by the output of the capabilities routine;
    writing a value to a status register, wherein the value is uniquely associated with a successful transition to the second memory performance state;
    modifying the core frequency of the memory of the computing system to the predetermined core frequency associated with the second performance state
    running a test routine;
    comparing the output of the test routine to the value of the status register to verify that the computing system successfully transitioned to the second memory performance state; and
    returning to the first memory performance state if the computing system does not successfully transition to the second memory performance state after the step of running the test routine is performed a predetermined number of times.

17. The method for transitioning between a first memory performance state and a second memory performance state in a computing system of claim 16, wherein the number of available memory performance states is depending upon a measure of the power consumption of the computing system.

18. The method for transitioning between a first memory performance state and a second memory performance state in a computing system of claim 16, wherein the number of available memory performance states is depending upon a measure of the thermal output of the computing system.

19. The method for transitioning between a first memory performance state and a second memory performance state in a computing system of claim 16,
    wherein the number of available memory performance states is depending upon a measure of the power consumption of the computing system; and
    wherein the number of available memory performance states is depending upon a measure of the thermal output of the computing system.

* * * * *